(12) United States Patent
Oka et al.

(10) Patent No.: US 6,793,806 B2
(45) Date of Patent: Sep. 21, 2004

(54) WATER DISTRIBUTION AMOUNT PREDICTING SYSTEM

(75) Inventors: Toshiaki Oka, Tokyo (JP); Hiroaki Tsutsui, Tokyo (JP); Junji Nishimura, Kanagawa (JP)

(73) Assignee: Yamatake Corporation (JP)

( * ) Notice: Subject to any disclaimer, the term of this patent is extended or adjusted under 35 U.S.C. 154(b) by 39 days.

(21) Appl. No.: 10/264,604

(22) Filed: Oct. 3, 2002

(65) Prior Publication Data

US 2004/0074826 A1 Apr. 22, 2004

(51) Int. Cl.$^7$ .............................. E03B 1/00; G05D 7/06; G06F 17/60
(52) U.S. Cl. ......................... 210/87; 210/143; 700/283; 702/180; 702/182
(58) Field of Search ................... 210/87, 143; 700/283, 700/180, 182

(56) References Cited

FOREIGN PATENT DOCUMENTS

| JP | 03202515 A |   | 9/1991 |
| JP | 0830581 A  | * | 2/1996 |

* cited by examiner

Primary Examiner—Terry K. Cecil
(74) Attorney, Agent, or Firm—Irell & Manella LLP (57) ABSTRACT

Many actual data 30, each consisting of a set of an actual water distribution amount obtained in advance from a water management system 10 and a variable needed for prediction, are loaded and retained as history data 52, an input space of a case base 54 is quantized according to a desired output allowance error, each history data 52 is set in the quantized input space, and a case representing at least one history data is prepared to generate a case base 52. Then a similar case corresponding to a newly input prediction condition 40 is retrieved from the case base 54, and a water distribution amount corresponding to the prediction condition 40 is estimated from the retrieved similar case.

4 Claims, 12 Drawing Sheets

SET OF DATA IN SINGLE MESH

| x1 | x2 | y |
|---|---|---|
| 21.6 | 67.5 | 82.3 |
| 21.8 | 69.6 | 81.1 |
| 21.9 | 68.7 | 80.7 |

FIG.9A

INTEGRATING DATA IN
SINGLE MESH INTO ONE CASE

AVERAGING OF
OUTPUT VALUES

INPUT VALUE OF CASE IS
MEDIAN IN MESH

CASE GENERATED BY INTEGRATION

| x1 | x2 | y |
|---|---|---|
| 21.8 | 68.5 | 81.3 |

NEW DATA: B(23.9, 66.8, 48.2)

WHEN CASE EXISTS IN MESH TO
WHICH NEW DATA B BELONGS

| CASE BEFORE REVISION | x1 | x2 | y |
|---|---|---|---|
| | 23.8 | 65.5 | 49.7 |

OUTPUT y IS REVISED

| CASE AFTER REVISION | x1 | x2 | y |
|---|---|---|---|
| | 23.8 | 65.5 | 49.0 |

ONLY OUTPUT y OF CASE IN MESH TO
WHICH NEW DATA B BELONGS IS REVISED

: OUTPUT REVISION ARITHMETIC EXPRESSION $$Y_{new} = (1.0 - C_{Forget}) \times Y_{old} + C_{Forget} \times Y$$

$Y_{new}$ : OUTPUT VALUE AFTER REVISION
$Y_{old}$ : OUTPUT VALUE BEFORE REVISION
$Y$ : OUTPUT VALUE OF NEW DATA
$C_{Forget}$ : FORGETTING FACTOR

WATER DISTRIBUTION AMOUNT PREDICTING SYSTEM

TECHNICAL FIELD

The present a water distribution amount predicting system and, more particularly, to a water distribution amount predicting system which predicts the amount of water to be distributed from water purification facilities to water customers.

BACKGROUND ART

In water purification facilities, in distributing water to water customers such as factories, companies, stores, and homes, a predetermined water purification process is performed first, and then the water is distributed to each water customer. In general, in a water purification process, for example, a coagulant is charged into raw water taken in from a river or the like to form impurities into floc (particles) so as to make it settle, and the water is filtered. Since this process includes floc formation, sedimentation, and the like, it takes three to six hours for the entire water purification process. In addition, the amount of water that can be purified in a unit time is limited by the equipment size and the like. Furthermore, since a water purification process requires enormous power, it is required that the water purification process be done at nighttime when the power cost is comparatively low.

Owing to such limitations, in order to stably supply water to water customers, it is required that a water distribution amount be accurately predicted, and a necessary amount of water be stored in a distributing reservoir upon a water purification process before the water demand begins to increase, for example, at previous midnight.

In this case, water demand greatly varies depending on day, week, month, season, and the like. In addition, since the manner in which floc is formed varies depending on variation factors such as temperature and the pH value of raw water, the floc formation speed and sedimentation speed varies, and the time required for a water purification process also changes.

Conventionally, when a water distribution amount including such variation factors is to be predicted, a water demand pattern is plotted daily, and the amount of water to be prepared is predicted by referring to the pattern. Alternatively, a water distribution amount is predicted by using a Kalman filter, neural network, or memory-based learning.

In such a conventional water distribution amount predicting method, however, a water distribution amount cannot be accurately predicted in consideration of the time required for a water purification process. For example, according to the method of predicting a water distribution amount from graphed water demand patterns, all patterns associated with variation factors and water distribution amounts must be prepared, and an optimal pattern must be accurately selected from these enormous quantities of patterns. In practice, however, a pattern having some similarity to an optimal pattern is selected from a limited number of patterns, and hence only a rough tendency can be predicted. It is therefore inevitable that a large water distribution amount is estimated, resulting in wasting of a coagulant, drainage of purified water, and the like. Consequently, uneconomical operation becomes unavoidable.

In the method of predicting a water distribution amount by using a Kalman filter, a prediction can be made one hour before the water distribution at best but cannot be made in anticipation of the time required for a water purification process, i.e., three to six hours. According to the method of predicting a water distribution amount by using a neural network, although a prediction can be made in anticipation of a certain period of time, an optimal model is difficult to generate by learning. In addition, model updating requires a period of time similar to the time required for a water purification process, and it is difficult to evaluate a model itself and parameters. This method therefore lacks in practicability and cannot obtain sufficient reliability.

In the method of predicting a water distribution amount by using memory-based learning (e.g., Tamada et al., "Water Distribution Amount Prediction by Memory-Based Learning", 1992 National Convention Record I.E.E. Japan), since variables in different units and ranges are handled on the same level, proper distances must be set between input data and sampled data of the respective variables. Such distances must be determined for each actual water purification facilities by cut and try. As variables become multidimensional, enormous work is required to determine distances. This method therefore lacks in practicability. Furthermore, in order to improve prediction precision, all sampled data must be stored without being aggregated and changed. This requires an enormous storage capacity.

The present invention has been made to solve such problems, and has as its object to provide a water distribution amount prediction system which has high practicability and can predict a future water distribution amount with high reliability in anticipation of the time required for a water purification process.

DISCLOSURE OF INVENTION

In order to achieve the above object, a water distribution amount predicting system according to the present invention includes a case base generating unit which receives many actual data constituted by sets of actual water distribution amounts obtained in advance from water purification equipment and variables required for prediction, stores the data as history data, quantizing an input space of a case base in accordance with a desired output allowable error, and generates a case representing at least one history data by placing each history data in the quantized input space, thereby generating a case base, and a similar case retrieving unit which retrieves a similar case corresponding to a newly input variable from the case base, and estimates a water distribution amount corresponding to the newly input variable from the similar case retrieved by the similar case retrieving unit.

As the variables, time data associated with a time position at which the actual water distribution amount was obtained and environment data associated with an environment where the actual water distribution amount was obtained may be used. In addition, a past water distribution amount associated with the actual water distribution amount may be used.

In addition, the present invention may include a flowmeter which measures an actual amount of water distributed from the water purification equipment, and may update the case base by revising only a predetermined case in the case base using a set of the actual water distribution amount obtained by the flowmeter and a variable corresponding to the water distribution amount.

BEST MODE OF CARRYING OUT THE INVENTION

The present invention will be described next with reference to the accompanying drawings.

Figure 1:
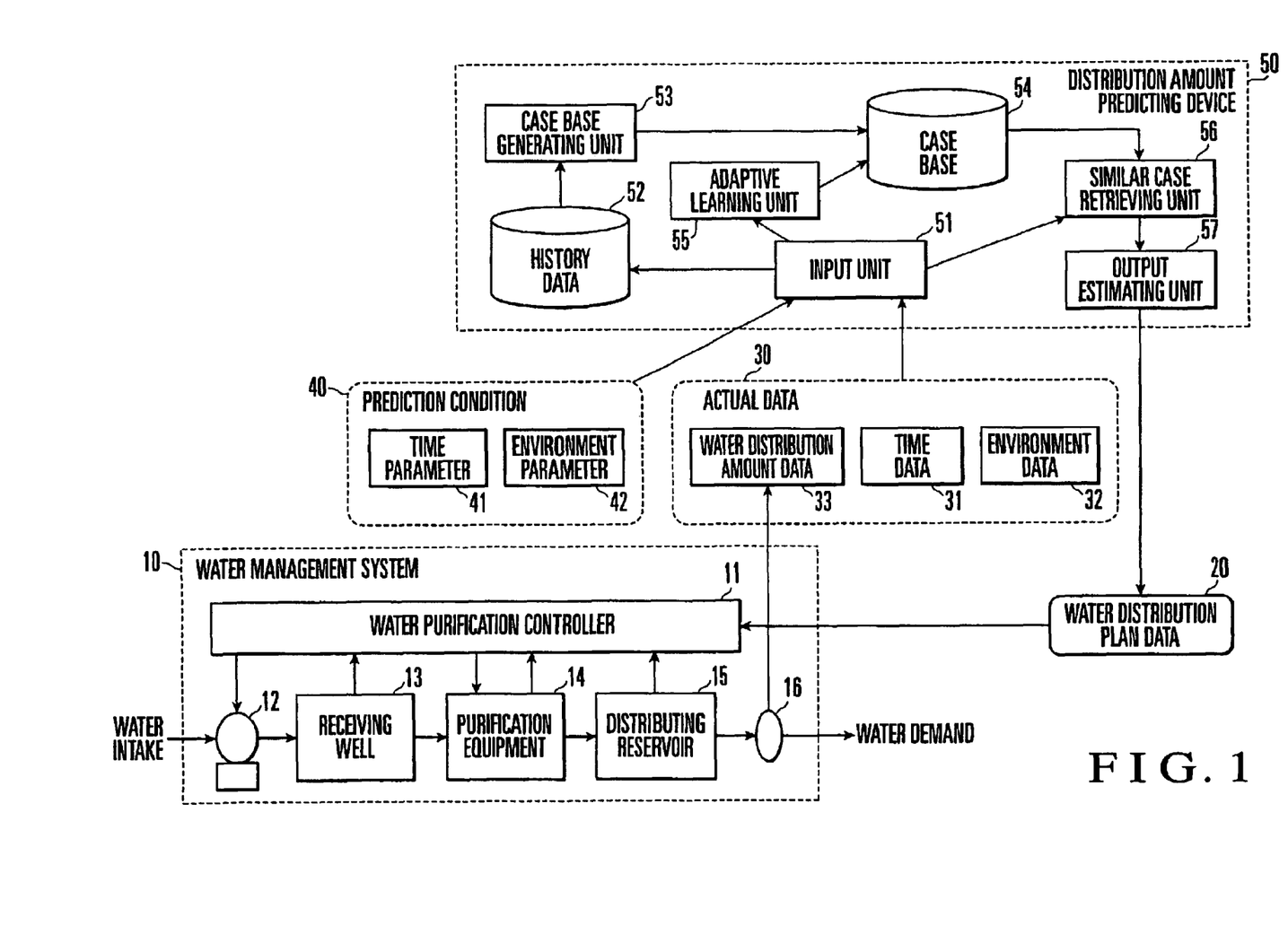
FIG. 1 is a block diagram showing a water distribution amount predicting system according to the first embodiment of the present invention.

FIG. 1 is a block diagram showing a water distribution amount predicting system according to the first embodiment of the present invention. The present invention will be described below by exemplifying the water purification facilities which perform a purification process for water taken in from a river and distribute the water to water customers. Referring to FIG. 1, a water management system 10 performs a water purification process for raw water taken in from a river or the like and distributes the water to water customers. A distribution amount predicting device 50 generates a case base from actual data 30 obtained from the water management system 10 and the like, predicts a water distribution amount required in the future on the basis of prediction conditions 40 that define a predicted water distribution amount, and outputs the resultant data as water distribution plan data 20. The water management system 10 controls a water purification process on the basis of this water distribution plan data 20.

The water management system 10 includes a receiving well 13 temporarily stores raw water taken in by a pump 12, a purification equipment 14 which performs a water purification process, e.g., charging a coagulant into raw water in the receiving well 13 to form impurities into floc (particles) so as to make them settle, and then filtering the water, a distributing reservoir 15 which temporarily stores purified water, a flowmeter 16 for measuring the amount of water distributed from the distributing reservoir 15 to water customers, and a water purification controller 11 which realizes water management based on the water distribution plan data 20 by controlling these facilities.

The actual data 30 is loaded as a case base into the distribution amount predicting device 50. As this actual data 30, water distribution amount data 33 is loaded, which represents the time water distribution amount corresponding to one hour or the total water distribution amount corresponding to one day which is measured by the flowmeter 16 of the water management system 10. In addition, together with this water distribution amount data 33, time data 31 and environment data 32, which constitute a set of data, are loaded as variables used as prediction conditions in predicting a water distribution amount. The time data 31 is data which represents the time, day, season, and the like when the water distribution amount data 33 was obtained. The environment data is data which represents the temperature, highest temperature, weather, and the like when the water distribution amount data 33 was obtained.

The prediction conditions 40 are variables that define the water distribution amount predicted by the distribution amount predicting device 50, and are constituted by a time parameter 41, environment parameter 42, and the like. As the time parameter 41, pieces of information associated with time, e.g., time information representing the time position of the water distribution amount to be predicted, day type information representing the type of the day, e.g., a weekday, holiday, previous day, national holiday, the end/beginning of the year, or working day, and season information representing the season to which the day belongs, are used singly or in combination. When, for example, a water distribution amount at tomorrow noon is to be predicted, "noon" is set as time information, and "holiday" is set as day type information if tomorrow is Sunday.

As the environment parameter 42, pieces of information associated with an environment, e.g., temperature information at the time position of the water distribution amount to be predicted, weather information, and highest temperature information at the day are used singly or in combination. When, for example, the water distribution amount at tomorrow noon is to be predicted, the temperature at the same time on yesterday, i.e., at yesterday noon, or a predicted temperature at tomorrow noon may be set as temperature information. As weather information, a tomorrow's predicted weather may be set. As highest temperature information, the yesterday's highest temperature or a tomorrow's predicated highest temperature may be set.

The respective parameters 41 and 42 of these prediction conditions 40 are set in correspondence with the respective data 31 and 32 of the actual data 30. Note that each information used for the actual data 30 or prediction conditions 40 is not limited to those described above, and can be changed, as needed, in accordance with the system configuration and required prediction precision. For example, water distribution amounts associated with the water distribution amount to be predicted, e.g., pieces of information associated with water distribution amounts such as the water distribution amount obtained 24 hours before the water distribution amount to be predicted and the yesterday's total water distribution amount, may be used in combination. As such water distribution amount information, data loaded in the past can be used.

The distribution amount predicting device 50 is comprised of an input unit 51 for loading the actual data 30 and prediction condition 40, a large quantity of history data 52 constituted by the loaded actual data 30, a case base generating unit 53 for generating a case base 54 constituted by many cases using the history data 52, and a similar case retrieving unit 56 for retrieving a similar case from the case base 54 on the basis of the newly input prediction condition 40.

In addition, the distribution amount predicting device 50 includes an output estimating unit 57 for estimating a water distribution amount corresponding to the new prediction condition 40 from at least one similar case retrieved by the similar case retrieving unit 56 and outputting the water distribution plan data 20 for a predetermined period, e.g., for tomorrow, and an adaptive learning unit 55 for partially revising the case base 54 on the basis of the new actual data 30. Of these components, the case base generating unit 53, similar case retrieving unit 56, output estimating unit 57, and adaptive learning unit 55 are implemented by software program, respectively.

The distribution amount predicting device 50 predicts/estimates a water distribution amount by using a case-based reasoning model. As this case base, the cumulative actual data 30 constituted by empirical cases in the past, e.g., the water distribution amount data 33, time data 31, and environment data 32, is used. The case base itself therefore incorporates the input/output relationship of the system, and requires no special model for representing an input/output relationship as in the prior art. For a new prediction condition, an existing case having a similar prediction condition is retrieved from the case base. At this time, a case base and similarity are defined by quantizing an input space by using an input quantization level as a parameter, and an evaluation index value is calculated, thereby determining a quantization level. For this reason, no convergence calculation is required, and the perfection degree of the model can be evaluated from this evaluation index value. This eliminates the necessity to independently perform model evaluation by using test data.

As described above, the present invention has high actual operability, and can predict a future water distribution amount with high reliability in consideration of the time required for a water purification process. Even if, therefore, it takes some time to perform a water purification process and the amount of water that can be purified within a unit time is limited by the equipment size, a water purification process can be controlled to properly meet a water demand on the basis of an accurate predicted water distribution amount. This also makes it possible to perform a water purification process at nighttime when the power cost is comparatively low. In addition, as indicated by the simulation to be described later, a water distribution amount can be accurately predicted by using a very few kinds of variables, namely a time parameter, environment parameter, and past water distribution amount, as variables required for water distribution amount prediction based on the case base. As compared with the case wherein many kinds of variables are used, the processing speed increases to the extent to which the number of variables used decreases, and the real-time performance of the overall system improves. In addition, there is no need to use many sensors and the like for detecting these variables, and hence the equipment cost can be reduced.

The operation of the present invention will be described next.

Figure 2:
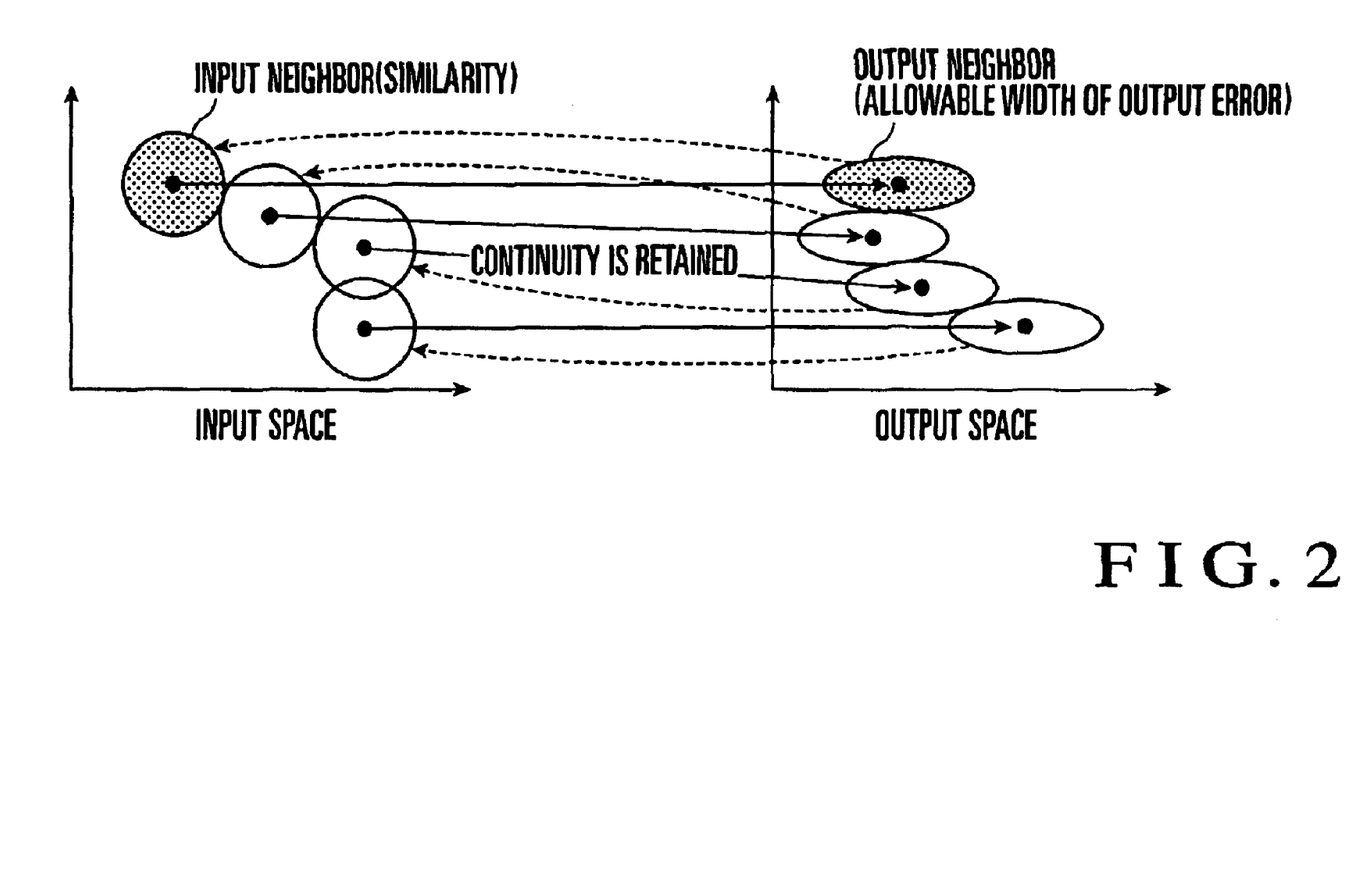
FIG. 2 is a view for explaining the concept of topology used for a case-based reasoning model according to the present invention.
Figure 3A:
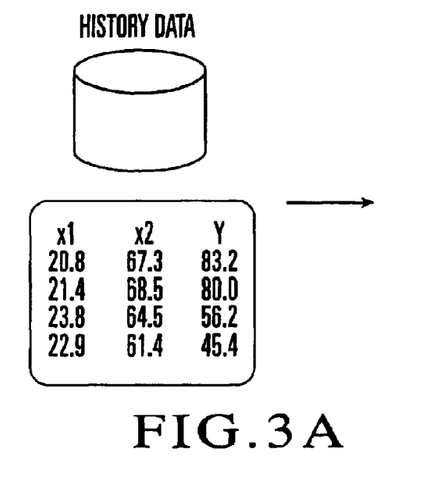
FIGS. 3A–D are views for explaining quantization processing for an input space.
Figure 3B:
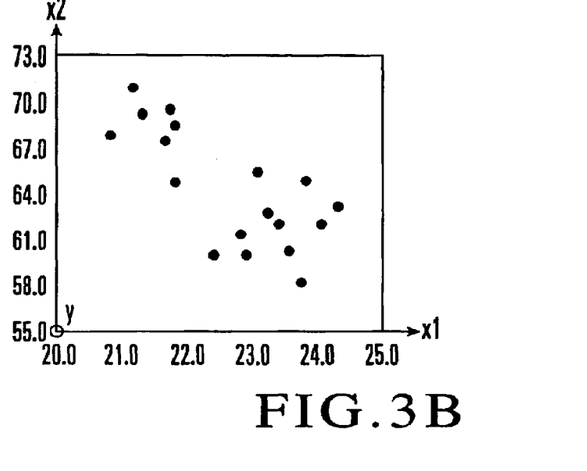
Figure 3C:
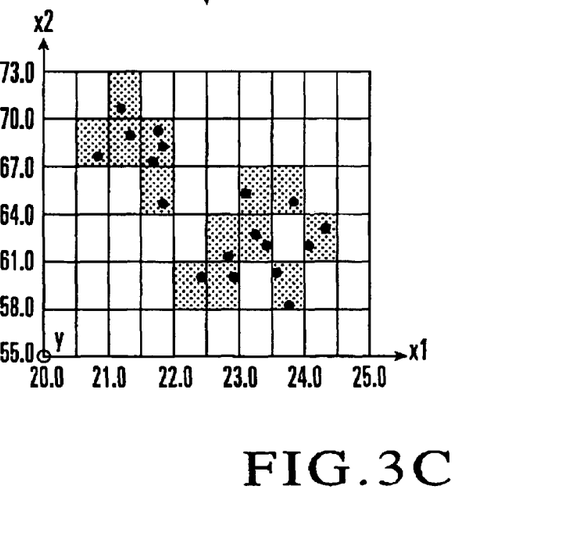
Figure 3D:
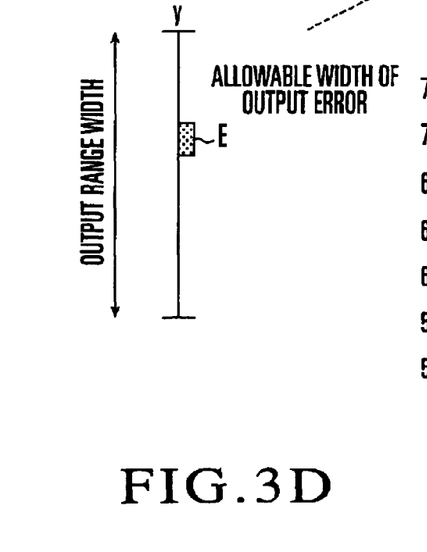
Figure 4:
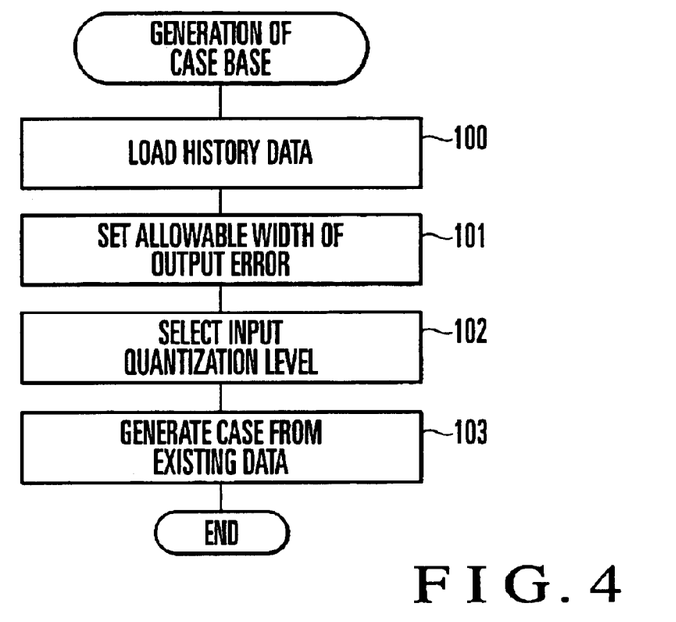
FIG. 4 is a flow chart showing case base generation processing.

The operation of the case base generating unit 53 of the distribution amount predicting device 50 will be described first with reference to FIGS. 2 to 4. FIG. 2 is a view for explaining the concept of topology used in a case-based reasoning model according to the present invention. FIGS. 3A–3D are views for explaining quantization processing in an input space. FIG. 4 is a flow chart showing case base generation processing.

According to the case-based reasoning model of the present invention, an input space is quantized into a topological space on the basis of the concept of continuous mapping in mathematical topology, thereby generally defining a case base corresponding to an output allowable error (required precision) and similarity.

According to the concept of continuous mapping in topology, a necessary and sufficient condition for allowing map f: X. Y to be continuous in spaces X and Y is that open set (output neighbor) O inverse map f−1(O) in Y is equivalent to an open set (input neighbor) in X.

Assuming that the map f from an input space to an output space is continuous according to the concept of this continuous mapping, as shown in FIG. 2, an output neighbor is determined by using the allowable width of an output error in the output space. This makes it possible to associate the output neighbor with an input neighbor that satisfies the allowable width of the output error. With this operation, the input space can be quantized and grasped as a topological space.

In the present invention, this input space quantization processing is done in the manner shown in FIG. 3. History data is constituted by a combination of input data and output data obtained in the past. In this case, history data is constituted by inputs x1 and x2 and an output y. These history data are distributed in an input space x1–x2 as shown in FIG. 3(b). When the data is to be quantized with meshes which have predetermined widths, respectively, in the x1 and x2 directions and are arranged at equal intervals, as shown in FIG. 3(c), the size of each mesh, i.e., an input quantization level, is determined in consideration of an allowable width of an output error, as shown in FIG. 3(d).

The allowable width of the output error is a value indicating the degree to which the error between an output obtained by reasoning and an unknown true value corresponding to new input data is allowed, and is set as a modeling condition in advance. By determining a mesh size by using this allowable width, therefore, an input neighbor corresponding to the size of an output neighbor, i.e., a case, can be defined, and the error of output data inferred from all input data belonging to the case satisfies the allowable width of the output error.

The case base generating unit 53 generates the case base 54 by quantization processing in such an input space. Referring to FIG. 4, the history data 52 is loaded (step 100), and modeling conditions such as the allowable width of an output error are set (step 101). Each type of evaluation index is calculated on the basis of the allowable width, and an input quantization level is selected for each input variable on the basis of this evaluation index (step 102). Each case constituting the case base 54 is then generated from the history data 52 distributed to the respective meshes (step 103).

Figure 5:
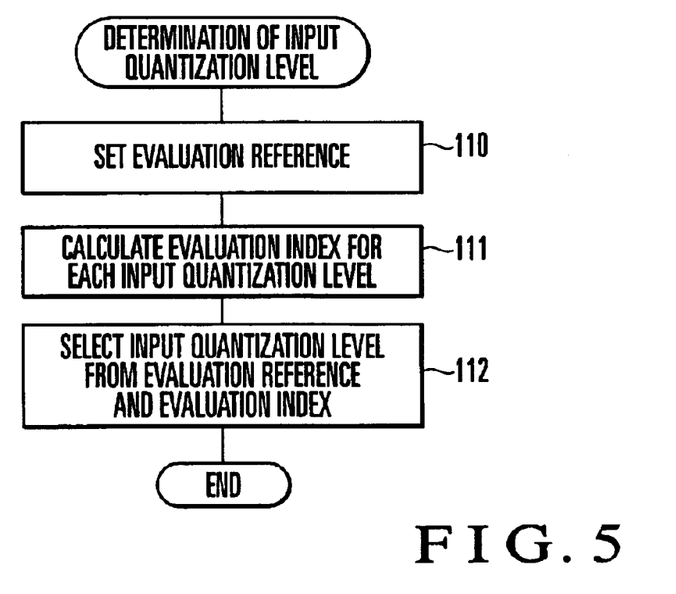
FIG. 5 is a flow chart showing input quantization level determination processing.
Figure 6:
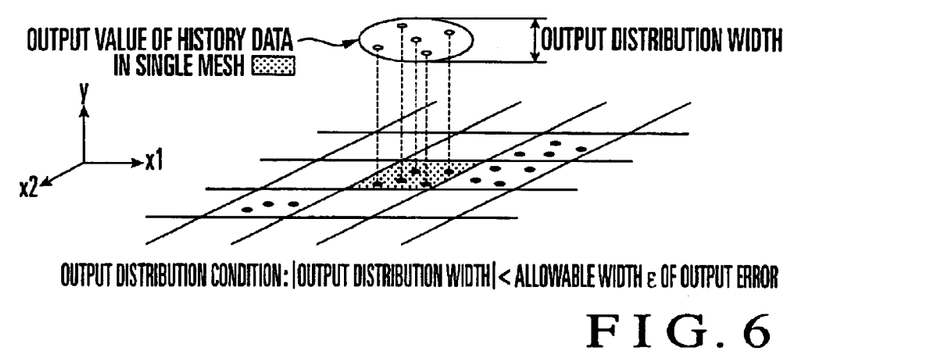
FIG. 6 is a view for explaining an output distribution condition.
Figure 7:
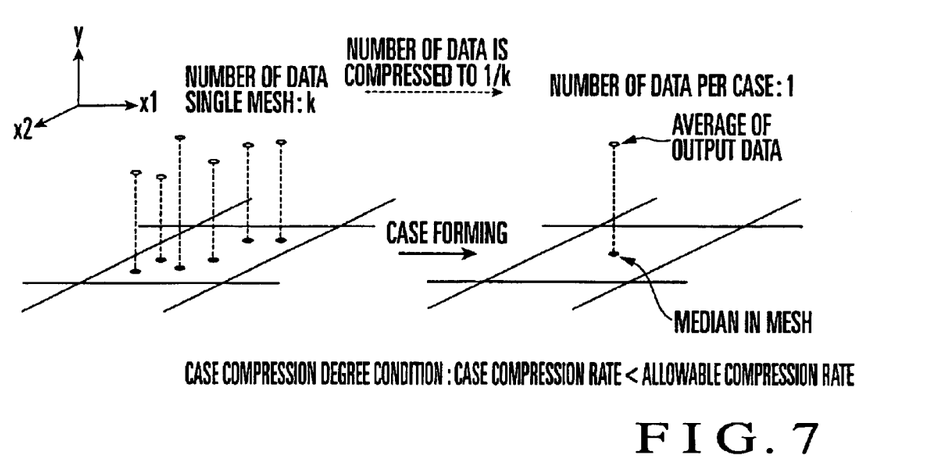
FIG. 7 is a view for explaining a continuity condition.
Figure 8:
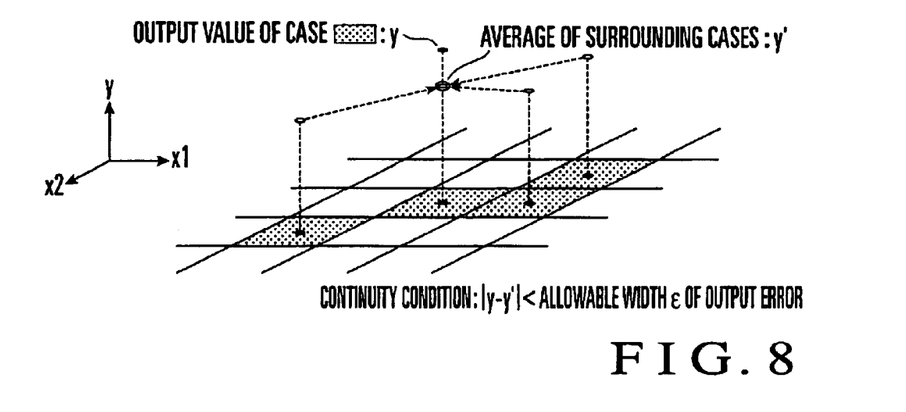
FIG. 8 is a view of explaining a case compression degree condition.

Input quantization level determination processing using an evaluation index will be described with reference to FIGS. 5 to 8. FIG. 5 is a flow chart showing input quantization level determination processing. FIG. 6 is a view for explaining an output distribution condition which is one of evaluation indexes. FIG. 7 is a view for explaining a continuity condition which is one of the evaluation indexes. FIG. 8 is a view for explaining a case compression degree condition which is one of the evaluation indexes.

In input quantization level determination processing, an evaluation reference (threshold) is set first as a reference for the determination of the validity of an evaluation index (step 110). An evaluation index is calculated for each input quantization level (step 111). The obtained evaluation index is compared with the evaluation reference to select one of input quantization levels by which an evaluation index that satisfies the evaluation reference (step 112). As the evaluation reference, an input quantization level is preferably selected, by which 90% cases or more satisfy the output distribution condition and continuity condition. In this system, a division number of 90% or 95% is displayed. These values 90% and 95% are considered to be statistically proper values.

The output distribution condition is a condition that with respect to an arbitrary mesh obtained by quantizing the input space with the selected input quantization level, the output distribution width of an output y of history data belonging to the mesh is smaller than the allowable width of the output error, as shown in FIG. 6. With this condition, it is checked whether one mesh, i.e., an input neighbor, satisfies a condition determined at the corresponding output neighbor, i.e., the allowable width of the output error.

The continuity condition is a condition that with respect to an arbitrary mesh obtained by quantizing the input space with the selected input quantization level, the difference between an output value y of a case generated with the mesh and an average output value y' of a surrounding case exiting around the case is smaller than the allowable width of the output error, as shown in FIG. 7. With this condition, it is checked whether the difference in output value between the respective cases, i.e., the input neighbors, satisfies the condition determined between the corresponding output neighbors, i.e., the allowable width of the output error. When this continuity condition is satisfied, it can be determined that the respective cases cover the input space so as to continuously satisfy a desired precision.

The case compression degree condition is based on the compression rate of history data which is achieved when the data are formed into a case. As shown in FIG. 8, when a plurality of history data belong to an arbitrary mesh obtained by quantizing an input space with a selected input quantization level and are formed into a case, these k history data become one data representing the case. As a consequence, the data is compressed to 1/k. In this case, it is checked whether the case compression rate of the overall history data satisfies an allowable compression rate designated as a modeling condition.

Input quantization levels are sequentially determined for the respective input variables. If, for example, input variables are x1, x2, . . . , xn, input quantization levels are sequentially determined from x1 to xn. In this case, when an evaluation index is to be calculated, an input quantization level must be assigned to all input variables. In obtaining an evaluation index associated with xi, therefore, the input quantization level that has already been determined at this time is used for x1 to xi−1, and the same input quantization level as that for xi is used with respect to xi+1, . . . , xn after xi.

With regard to each of the output distribution condition and continuity condition of the conditions descried above, the ratio of cases that satisfy the condition to all the cases, i.e., an evaluation index sufficiency ratio, is used as an evaluation index. For example, an evaluation index value for an input quantization level m associated with xi is obtained by the ratio of cases that satisfy the evaluation index condition to all the cases generated by quantizing the input range widths of x1, x2, . . . , xn with the respective input quantization levels.

With regard to the case compression degree condition, as an evaluation index value for the input quantization level m associated with xi, the case compression rate of the overall history data obtained by quantizing the input range widths of all the input variables x1, x2, . . . , xn with the input quantization level m is used.

With regard to the input variable xi, one of input quantization levels by which all these evaluation index values clear the evaluation reference is selected and determined as an input quantization level for the input variable xi.

Figure 9A:
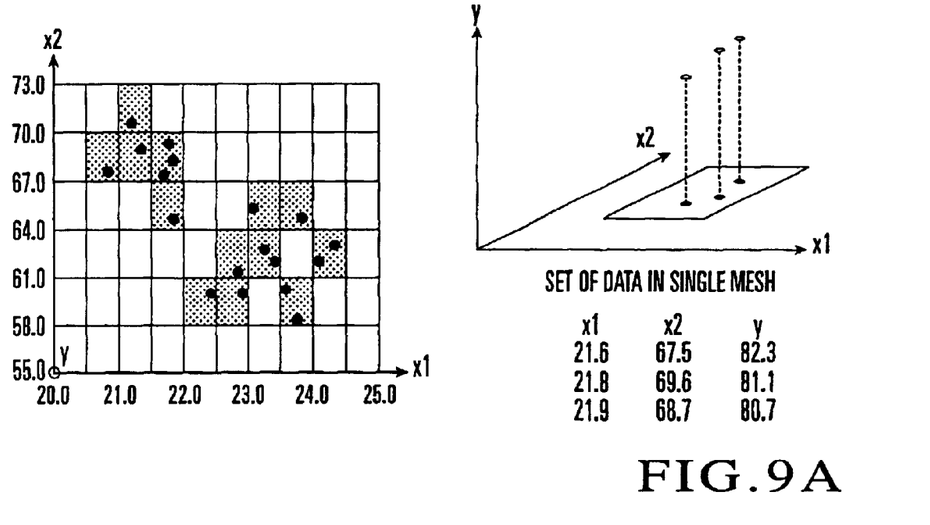
FIGS. 9A–B are views for explaining case generation processing.
Figure 9B:
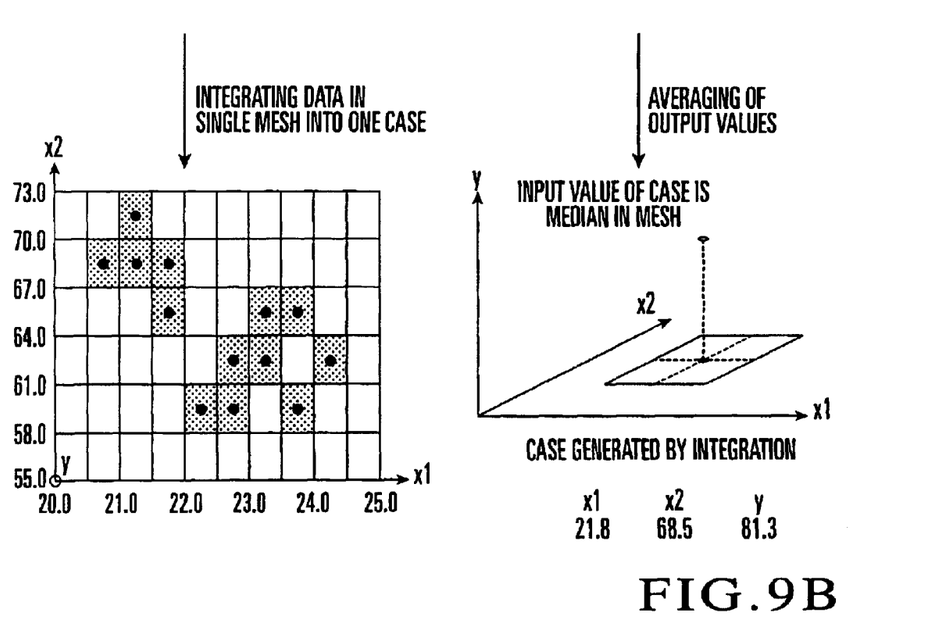
Figure 10:
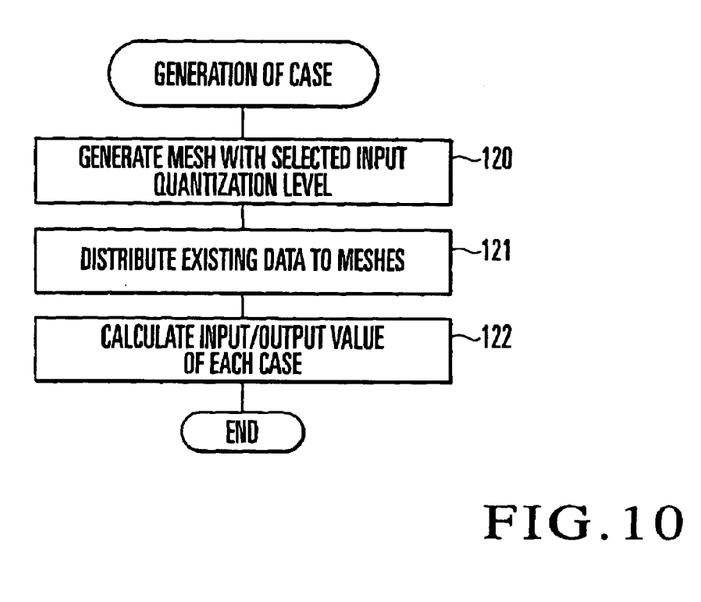
FIG. 10 is a flow chart showing case generation processing.

In the case base generating unit 53, an input quantization level is selected in the above manner, and each history data is distributed to each input space quantized with the input quantization level, each mesh in this case, thereby generating a case. FIG. 9 is a view for explaining case generation processing. FIG. 10 is a flow chart showing case generation processing.

First of all, meshes are generated by quantizing (dividing) each input variable on the basis of a selected input quantization level (step 120). Referring to FIG. 9(a), the input variable x1 is divided by 10, and the input variable x2 is divided by 6.

The respective history data are distributed to the respective meshes (step 121). Meshes in which the history data exist are selected as cases, and input and output values in the meshes are calculated (step 122). When three history data are distributed to a single mesh as shown in FIG. 9(a), they are integrated into one case. In this case, the average of outputs y of the three history data is used as an output value representing the case, and a median in the mesh is used as an input value representing the case.

The distribution amount predicting device 50 in FIG. 1 estimates a water distribution amount from newly input prediction conditions by using the case base 54 generated in this manner.

Figure 11:
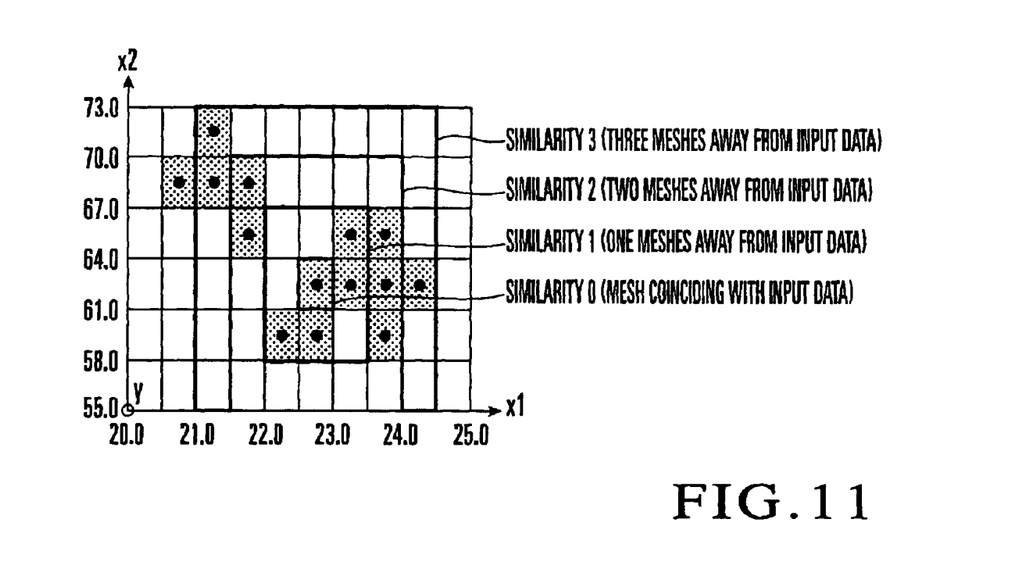
FIG. 11 is a view for explaining the definition of similarity.
Figure 12:
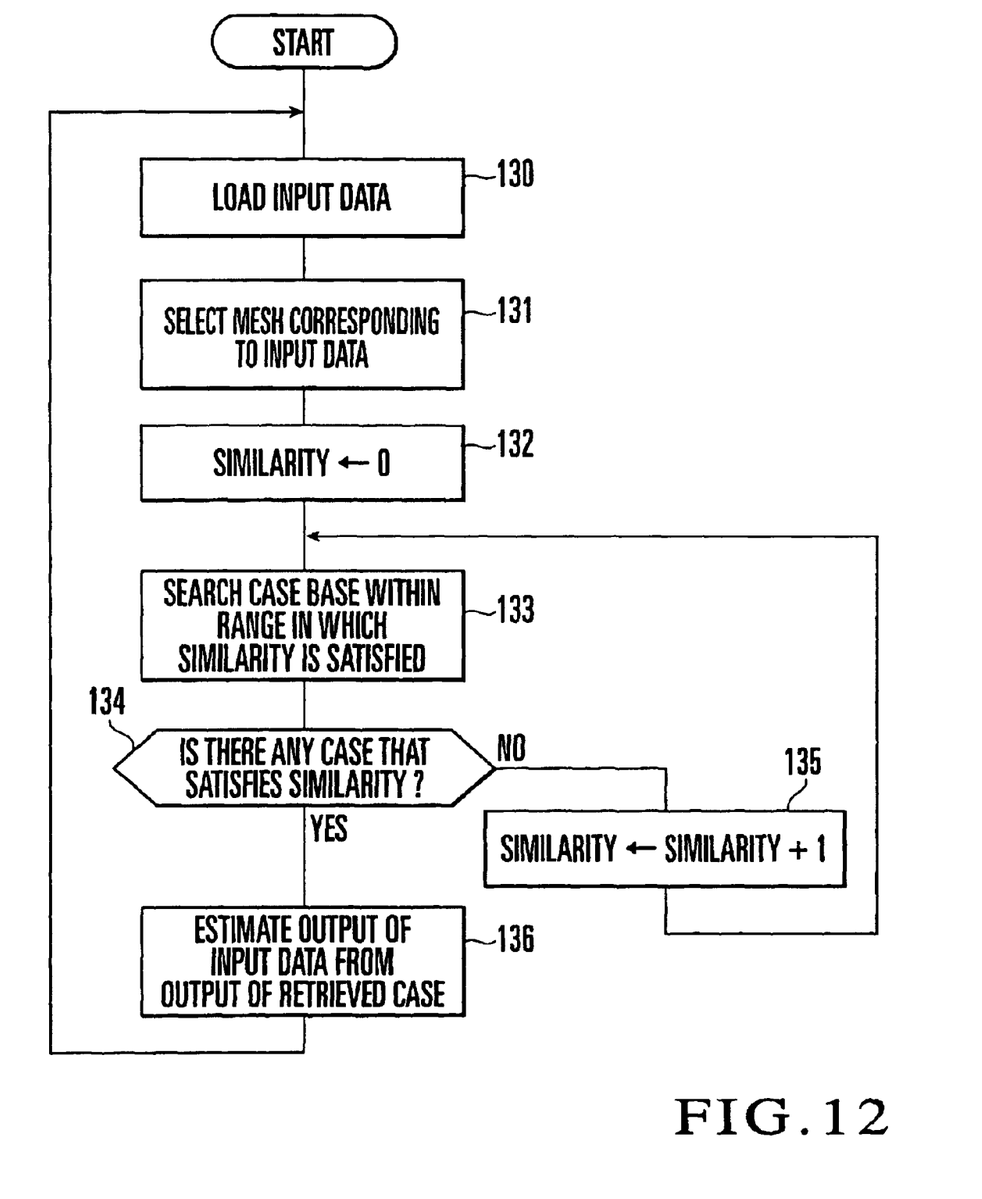
FIG. 12 is a flow chart showing similar case retrieval processing.

First of all, the similar case retrieving unit 56 receives the prediction conditions 40 sampled by the input unit 51 as input variables, and retrieves a similar case from the case base 54 by using a similarity. FIG. 11 is a view for explaining the definition of the similarity. FIG. 12 is a flow chart showing similar case retrieval processing in the similar case retrieving unit 56.

The similarity is a measure that represents the degree of similarity between each case and a mesh of the meshes arranged in the input space of the case base 54, which corresponds to new prediction conditions, i.e., input data.

Referring to FIG. 11, if a case exists in a central mesh corresponding to input data, it is defined that the case and the input data have "similarity=0". The input data and a case immediately adjacent to the central mesh have "similarity=1". Subsequently, the similarity increases one by one with an increase in a distance from the central mesh.

In performing estimation, therefore, the estimated value based on a case with a similarity i has a precision within (i+1) x output allowable width. In this case, if cases on the two sides of an input value used for estimation are properly used, an output value with a precision higher than (i+1) x output allowable width can be expected. If only a case on one side of a value for estimation, a precision similar to (i+1) x output allowable width is expected from the continuity of input and output values.

As shown in FIG. 12, the similar case retrieving unit 56 receives the new prediction condition sampled by the input unit 51 as input data (step 130), and selects a mesh corresponding to the input data from the input space which the case base 54 has (step 131). The similar case retrieving unit 56 also initializes the similarity used as a case retrieval range to 0 (step 132), and retrieves a similar case from the case retrieval range indicated by the similarity (step 133).

If a case exists in the mesh corresponding to the input data (step 134: YES), this case is output as a similar case (step 136).

If it is determined in step 134 that no case exists in the mesh corresponding to the input data (step 134: NO), the similarity is increased by one to extend the case retrieval range (step 135). The flow then returns to step 133 to retrieve a similar case again.

In this manner, the similar case retrieving unit 56 retrieves similar cases corresponding to the new prediction condition from the case base 54. The output estimating unit 57 estimates a water distribution amount corresponding to the new prediction condition on the basis of these similar cases.

Figure 13:
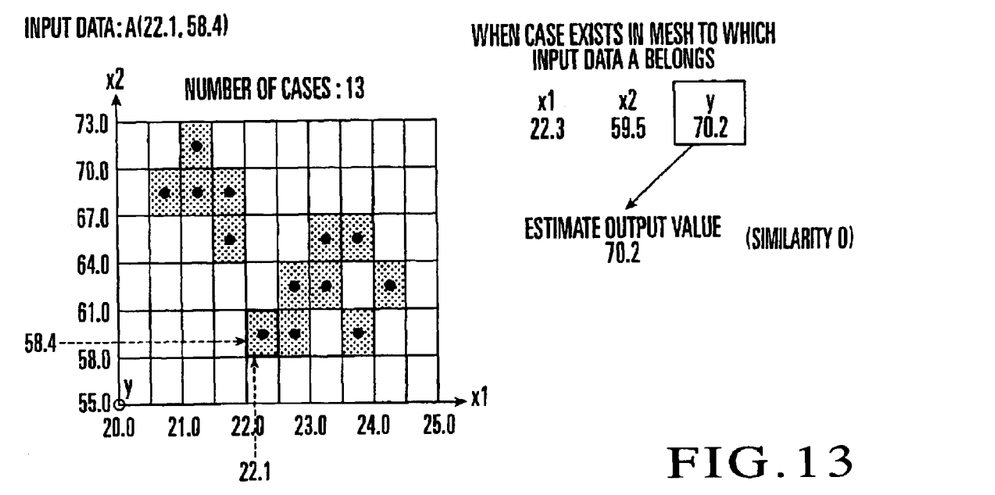
FIG. 13 is a view for explaining output estimating operation (when a similar case exists)

If, for example, a case exists in a mesh 150 corresponding to input data A (22.1, 58.4) as shown in FIG. 13, output value y=70.2 of this case is selected as an estimated output value.

Figure 14:
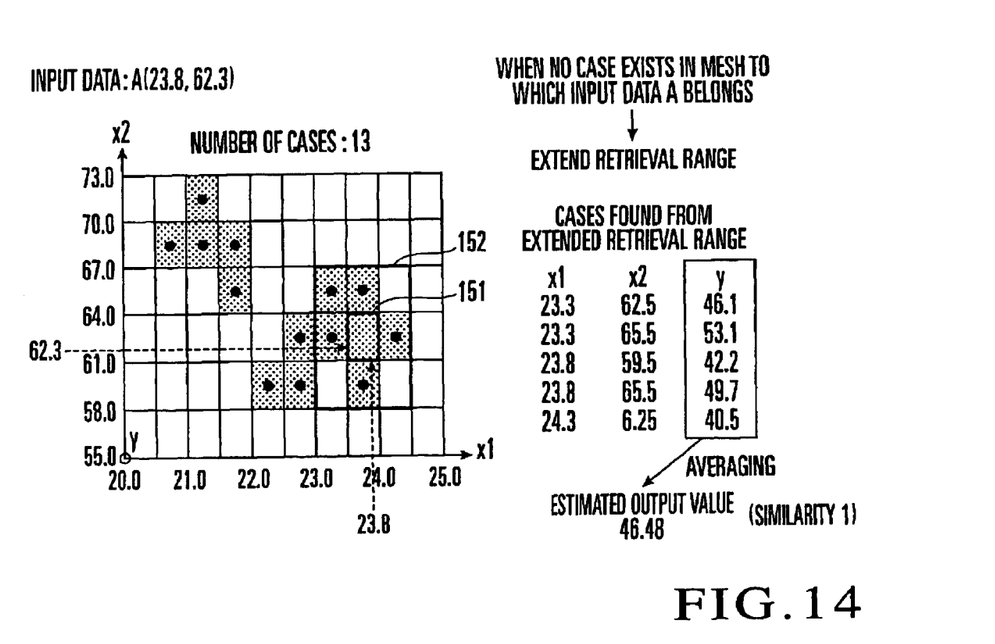
FIG. 14 is a view for explaining output estimating operation (when no similar case exists)

If no case exists in a mesh 151 corresponding to input data A (23.8, 62.3) as shown in FIG. 14, a retrieval range 152 is extended to retrieve a similar case. An estimated output value is then calculated from the retrieved case. If a plurality of cases are retrieved, the average of the output values of the cases is used as an estimated output value.

In this manner, a water distribution amount corresponding to the new prediction condition is estimated, and the water distribution plan data 20 based on the estimated amount is informed from the output estimating unit 57 to the water management system 10.

The operation of the adaptive learning unit will be described next with reference to FIGS. 15 and 16.

The adaptive learning unit 55 updates the case base 54 on the basis of the new actual data 30 obtained from the input unit 51. In this case, the actual data 30 may be automatically obtained, for example, hourly by using a calendar function, temperature sensor, and the like. This allows automatic operation.

First of all, a case corresponding new data is retrieved from an input space which the case base 54 has. If a case corresponding to the new data exists, only the case is revised.

Figure 15:
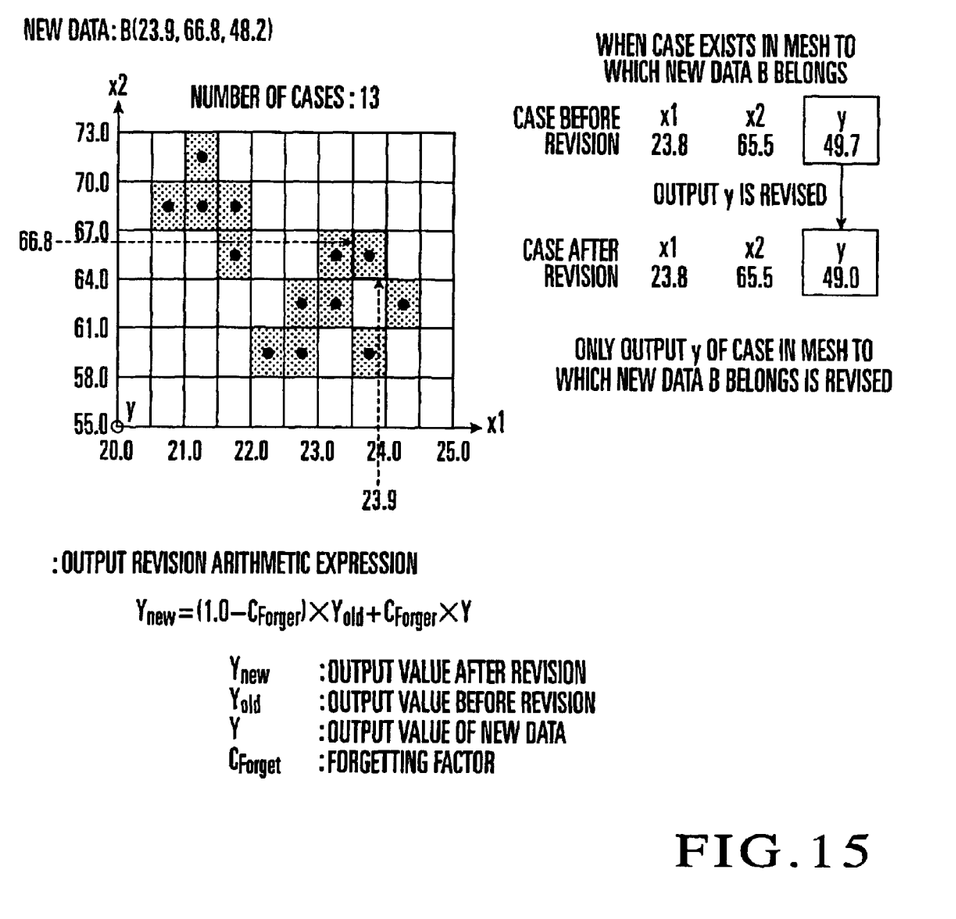
FIG. 15 is a view for explaining adaptive learning operation (when a corresponding case exists)

FIG. 15 is a view for explaining adaptive learning operation when a corresponding case exists. In this case, since a case 160 corresponding to new data B (23.9, 66.8, 48.2) exists, new output value y=49.0 of the case is calculated from output value y=48.2 of the new data B and an output value of 49.7 before revision of the case 160. As an output revision arithmetic expression, a forgetting factor CForget is prepared, and an output value Yold before revision and an output value Y of the new data B are added at the ratio indicated by this forgetting factor to obtain an output value after the revision of the case.

If no case corresponding to the new data exists, a new case is generated on the basis of the new data.

Figure 16:
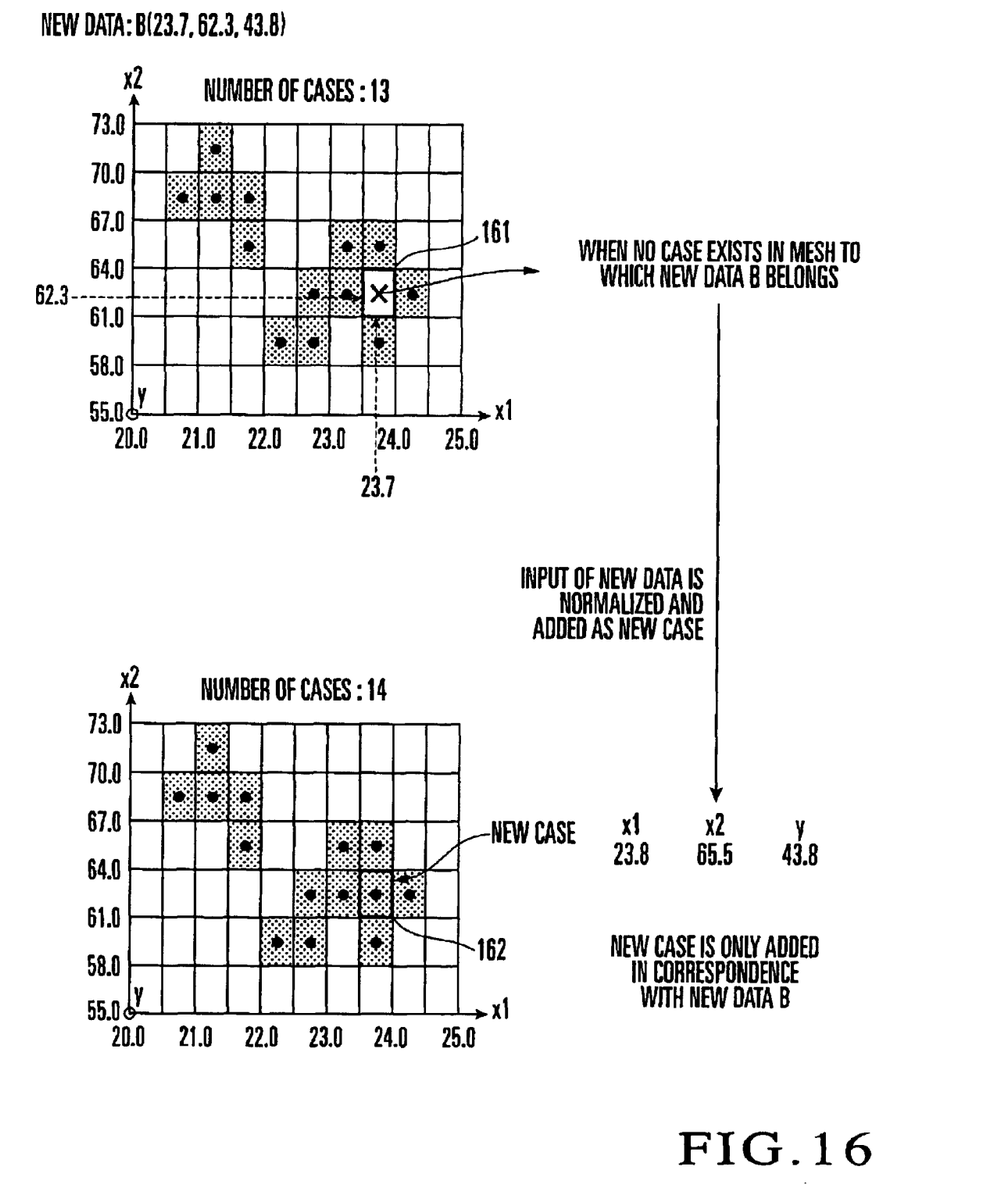
FIG. 16 is a view for explaining adaptive learning operation (when no corresponding case exists)

FIG. 16 is a view for explaining adaptive learning operation when no corresponding case exists. In this case, since no case exists in a mesh 161 corresponding to new data B (23.7, 62.3, 43.8), a median in the mesh corresponding to the new data B is set as an input value, and a new case 162 having an output value y of the new data B as a representative output value is generated. This case is then added to the case base 54.

Figure 17A:
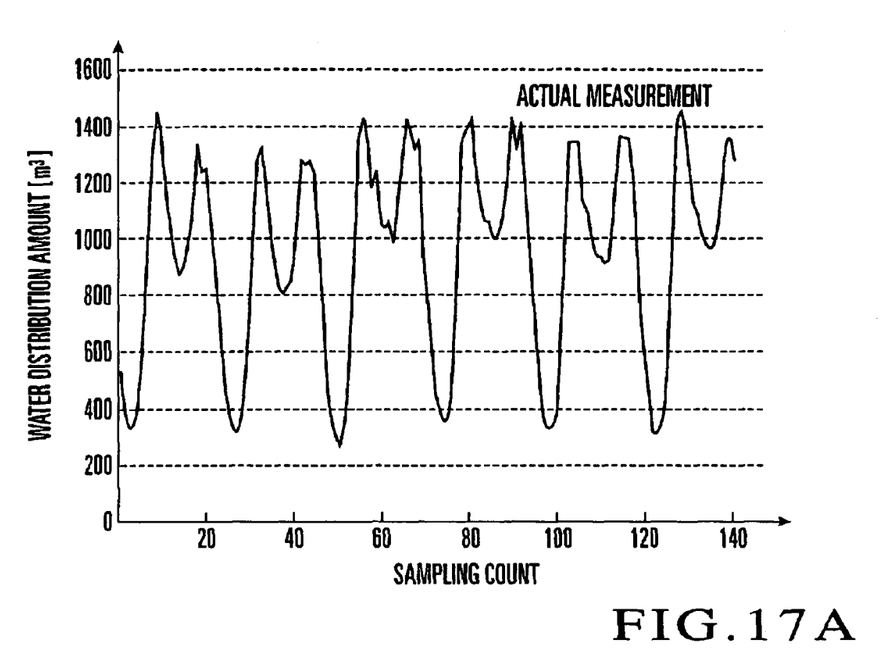
FIGS. 17A, 17B is a view showing the simulation result obtained by using a case-based reasoning model according to the present invention.
Figure 17B:
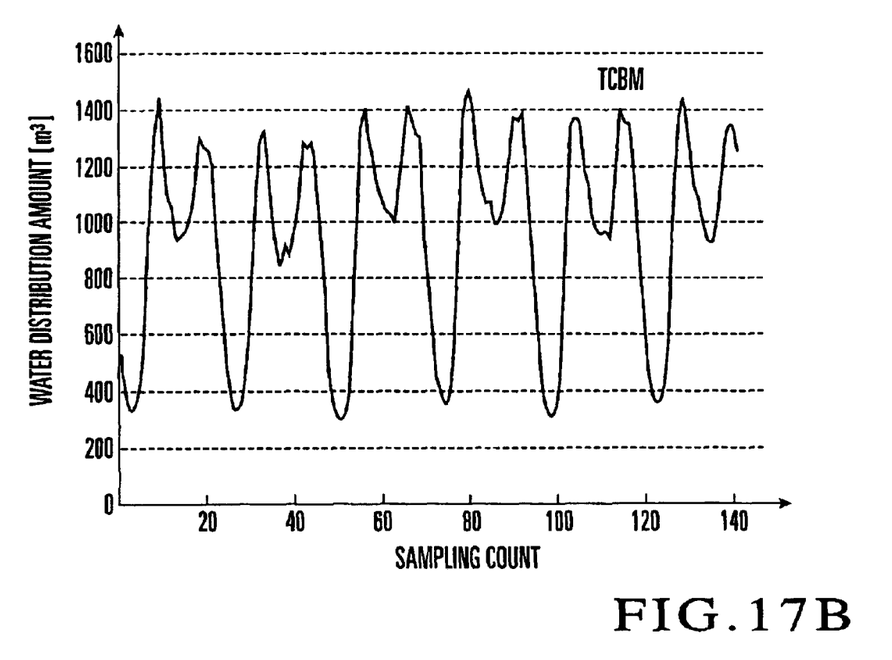

FIG. 17 shows a simulation result indicating a predicted water distribution amount obtained by using a case-based reasoning model according to the present invention and an actual water distribution amount. In this case, a water distribution amount is predicted at time T1 24 hours ahead of time T0 as a prediction time point, and the temperature 24 at the time (time T0 in this case) 24 hours ahead of time T1, the day type at time T1, and the water distribution amount at the time (time T0 in this case) 24 hours ahead of time T1 are used as the prediction conditions 40.

FIG. 17(b) shows the estimated output value from the case-based reasoning model. As is obvious, there is little difference between this value and the actual water distribution amount shown in FIG. 17(a) which is detected by the water management system 10, and the estimated output value follows the actual water distribution amount almost without any delay even if the water distribution amount changes with time.

The reasoning module used by the distribution amount predicting device 50 is obtained by applying the framework of a case-based reasoning to modeling, which is based on the concept of topology and can be said to be a modeling technique that can be applied to a general target in which the continuity of an input/output relationship in a system holds. According to the conventional modeling technique, model parameters such as the order of a model and a network structure are identified. In contrast to this, in the case-based reasoning model of the present invention, the topology of an input space is identified by designating a desired output allowable error.

Data is therefore stored as a case in an identified input space. When an output is to be estimated, the reliability of the estimated output value can be indicated by the topological distance (similarity) between an input and an input case stored in advance. According to the present invention, since a future water distribution amount is estimated by using such a model, the following effects can be obtained as compared with conventional reasoning models such as a neural network and regression model.

According to a conventional reasoning model, 1) since a special model structure is used to define an overall input/output relationship, it takes a lot of trouble to find an optimal structure for the system.

2) When a large amount of history data are subjected to learning, a convergence calculation must be done to identify a plurality of parameters which a model structure has. An enormous period of time is required for this processing.

3) Even when a model is to be updated on the basis of new data, parameters must be identified. In practice, therefore, adaptive learning is difficult to do.

4) It is difficult to grasp how much a model output value can be trusted with respect to an input value for estimation.

In contrast to this, according to the present invention, 1) since cases (problems and answers) experienced in the past are stored as a case base, and an input/output case incorporating an input/output relationship in the system is used, there is no need to use any special model representing an input/output relationship.

2) When a new problem is input, an existing case having a problem similar to the new problem is retrieved from a case base. At this time, an input space is quantized by using an input quantization level as a parameter to define a case base and similarity, and an evaluation index value is calculated, thereby determining a quantization level. For this reason, no conversion calculation is required. In addition, the perfection degree of the model can be evaluated from this evaluation index value, and hence there is no need to independently evaluate a model by using test data as in the prior art.

In addition, according to the present invention, 3) an answer to a retrieved similar case is corrected to obtain an answer to a newly input problem. Since the similarity of the retrieved case to an input value for estimation can be determined, this similarity can be used to evaluate the reliability of an output value.

4) After a correct answer to a newly input problem is found, the new case is added to the case base. Therefore, the case base can be partially revised on the basis of the new data, and there is no need to identify parameters as in the prior art. This facilitates adaptive learning.

A problem of learning and a convergence calculation in a conventional model is equivalent to a problem of definition of a case base structure and similarity in case-based reasoning (CBR). In conventional case-based reasoning, such definition cannot be done without sufficient knowledge about a target, posing a serious problem in terms of engineering. According to the case-based reasoning model of the present invention, general definitions of a case base corresponding to an output allowable error, i.e., a required precision, and similarity are made by quantizing an input space into a topological space on the basis of the concept of continuous mapping in topology.

As has been described above, the present invention includes a case base generating unit which receives many actual data constituted by sets of actual water distribution amounts obtained in advance from water purification equipment and variables required for prediction, stores the data as history data, quantizing an input space of a case base in accordance with a desired output allowable error, and generates a case representing at least one history data by placing each history data in the quantized input space, thereby generating a case base, and a similar case retrieving unit which retrieves a similar case corresponding to a newly input prediction condition from the case base, and estimates a water distribution amount corresponding to the newly input prediction condition from the similar case retrieved by the similar case retrieving unit. Therefore, the present invention has high practicability and can predict a future water distribution amount with sufficient reliability in consideration of the time required for a water purification process as compared with the case wherein a water distribution amount is predicted by using a Kalman filter, neural network, memory-based learning as in the prior art.

INDUSTRIAL APPLICABILITY

As has been described above, the water distribution amount predicting system according to the present invention has high practicability and can predict a future water distribution amount with sufficient reliability in consideration of the time required for a water purification process. A volute spring can be effectively used as a cover for the tool post moving shaft of a tool machine such as a lathe, a cover for the guide pole of a pressing machine, a scratchproof, dust-proof cover, or the like, and is especially suited for a portion where the distance between members to be covered changes.

What is claimed is:

1. A water distribution amount predicting system which predicts an amount of water to be distributed from water purification equipment, characterized by comprising:

a case base generating unit which receives many actual data constituted by sets of actual water distribution amounts obtained in advance from water purification equipment and variables required for prediction, stores the data as history data, quantizing an input space of a case base in accordance with a desired output allowable error, and generates a case representing at least one history data by placing each history data in the quantized input space, thereby generating a case base;

a similar case retrieving unit which retrieves a similar case corresponding to a newly input variable from the case base; and an output estimating unit which estimates a water distribution amount corresponding to the newly input variable from the similar case retrieved by said similar case retrieving unit.

2. A water distribution amount predicting system according to claim 1, characterized in that as the variables, time data associated with a time position at which the actual water distribution amount was obtained and environment data associated with an environment where the actual water distribution amount was obtained are used.

3. A water distribution amount predicting system according to claim 1, characterized in that a past water distribution amount associated with the actual water distribution amount is used in addition to the variables.

4. A water distribution amount predicting system according to claim 1, characterized by further comprising:

a flowmeter which measures an actual amount of water distributed from the water purification equipment; and an adaptive learning unit which updates the case base by revising only a predetermined case in the case base using a set of the actual water distribution amount obtained by said flowmeter and a variable corresponding to the water distribution amount.

* * * * *